Figure 1:
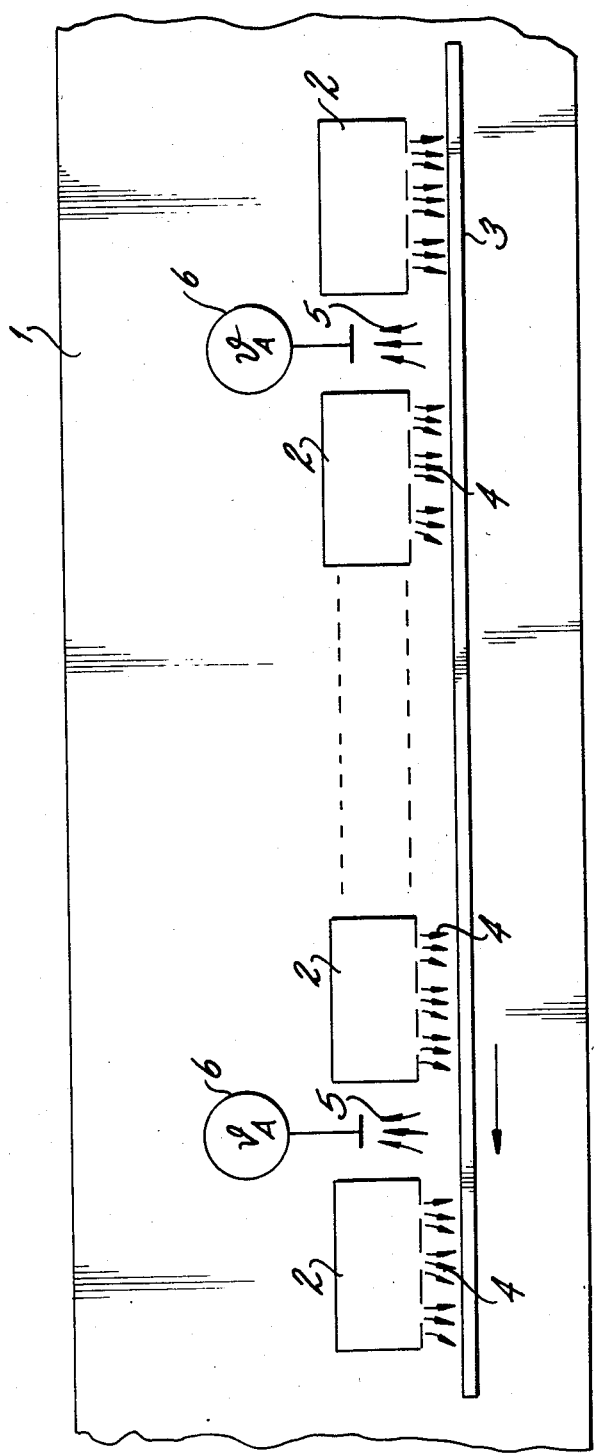

United States Patent [19]

Fiedler et al.

[11] Patent Number: 4,614,044

[45] Date of Patent: Sep. 30, 1986

[54] METHOD AND APPARATUS FOR OPTIMIZING THERMAL TREATMENT PROCESSES FOR FABRICS

[75] Inventors: Gerhard Fiedler, Greiz; Werner Fritzsche, Greiz-Moschwitz, both of German Democratic Rep.

[73] Assignees: VEB Forschung und Entwicklung; Betrieb des VEB Kombinat Wolle und Seide, both of Greiz, German Democratic Rep.

[21] Appl. No.: 675,384

[22] Filed: Nov. 27, 1984

[30] Foreign Application Priority Data

Dec. 30, 1983 [DD] German Democratic Rep. ... 258991

[51] Int. Cl.$^4$ .............................................. F26B 3/04
[52] U.S. Cl. .......................................... 34/25; 34/30; 34/31; 34/48; 34/52; 34/155
[58] Field of Search ...................... 34/30, 48, 52, 155, 34/25, 46, 54, 31, 160

[56] References Cited

U.S. PATENT DOCUMENTS

| 3,078,587 | 2/1963 | Huck | 34/48 |
| 4,204,337 | 5/1980 | Roos et al. | 34/52 |
| 4,498,248 | 2/1985 | Pabst | 34/155 |
| 4,505,053 | 3/1985 | Andersson et al. | 34/155 |

Primary Examiner—Albert J. Makay
Assistant Examiner—David W. Westphal
Attorney, Agent, or Firm—Jordan and Hamburg

[57] ABSTRACT

The invention relates to a method and an apparatus for optimizing thermal treatment processes of fabrics, preferably textile fabrics, in tensioning, drying and setting machines. According to the invention, the apparatus for the thermal treatment of fabrics comprises individual sections, to which is conveyed heated air. The air leaves each section via outgoing air slits, which are provided with at least two measuring locations per section. The measuring locations enable determination of the difference of the outgoing air temperature of the sections. After determining the location of the dryness point by comparing the outgoing air temperatures with the predetermined temperature, the measuring point at which there exists no difference, or only a minimal difference, is determined. The characteristic point for reaching the predetermined temperature of the fabric is thus found which, together with the found maximum, determines the adjustability of the speed, the energy supply or the outgoing air temperature.

1 Claim, 4 Drawing Figures

METHOD AND APPARATUS FOR OPTIMIZING THERMAL TREATMENT PROCESSES FOR FABRICS

FIELD OF APPLICATION OF THE INVENTION

The invention relates to a method and an apparatus for optimizing thermal treatment processes of fabrics, particularly textile fabrics, in tensioning, drying and setting machines.

CHARACTERISTICS OF THE KNOWN TECHNICAL SOLUTIONS

During the thermal treatment processing of fabrics, in principle the following states of the fabric are of interest:
1. The residual moisture or the degree of dryness of the fabric;
2. The thermal state of the fabric with respect to a temperature assumed during the process, with respect to energy and technological parameters.

Various methods are known which make it possible to detect these states by measuring technology in the course of the technological process and thus to draw the required conclusions for the technological process.

In order to ascertain the residual moisture of fabrics, it is known to determine the surface weight of the fabric during the technological process by means of radioactive measuring instruments, at entry and at exit, for instance, of a tensioning, drying and setting machine, and to determine the residual moisture of the fabric from the difference of the fabric weights, in order to derive energy optimizing steps therefrom.

This method has the disadvantage that radioactive measuring instruments for the determination of the fabric weight are very expensive to purchase and require constant maintenance. In addition, this method has the disadvantage, that it does not allow the determination of any information concerning the thermal state of the fabric.

Another method for the determination of the degree of dryness and the thermal state of the fabrics has been known for years, and consists in scanning the surface temperature profile of the fabric by measurement technology along the technological treatment apparatus, for instance, a tensioning, drying and setting machine, by means of a radiation pyrometer. Based upon the thus obtained temrperature profile, it is possible, to approximately find the point, at which the desired temperature of the fabric is reached. From the measured values of the individual termperatures of the determined temperature profile, it is possible to derive the dryness point of the fabric. By means of the information thus obtained, it is then possible to initiate optimization steps for the technological process. Although this method is distinguished by contactless surface temperature determination, it has a disadvantageously high cost of the instrument technology. A great disadvantage of this method consists in the required cooling apparatus for the radiation pyrometer for cooling its measuring system to the relatively low surrounding temperatures. Furthermore, considerable errors occur due to soiling of the sensing systems due to smoke, fog and steam in the environment of the materials to be measured.

In order to circumvent the disadvantages of the these methods, methods and apparatus have already been proposed using partially serial-connected thermoelements in the immediate vicinity of the moving fabric on a metal block, in order to permit the approximate determination of the surface temperature of the fabric. These methods have the disadvantage, that due to occurring strong whirling about and convection thereby occurring in the equipment, the measuring result is highly falsified, and furthermore, due to the twisting movements of the fabric, contact with the measuring apparatus which leads to damage of the fabric. Because of the falsified measurement results, it is therefore not possible to deive any exact optimization steps.

In the DE-OS No. 3,148,576, a method has been proposed which is directed exclusively to textile fabrics in tensioning, drying and setting machines. This method, in fact, determines the temperature difference between the incoming and outgoing air at the incoming and outgoing air nozzles along the tensioning, drying and setting machine by means of thermoelements or resistance thermometers. It is possible from the measurement of these temperature differences, to find the dryness point of the fabric passing through the technological process, when the temperature difference of a difference measuring position approaches the value of zero. Thereby one proceeds on the basis, that upon reaching this point, there no longer occurs any energy exchange between the incoming air and the fabric, and the temperature of the incoming and outgoing air is approximately the same. It can be concluded, therefore, that at a temperature difference approaching zero, the fabric is dry and has reached the temperature of the incoming air.

Although this method is characterized as inexpensive, it has a number of disadvantages, which cannot be disregarded. Because the method consists essentially in finding a minimum of the temperature difference, it has the disadvantage with respect to reliability of the given minimum at which the temperature difference approaches zero, because it has to be provided with serially-connected amplifiers of high-quality zero point stability, in order to be able to provide defined information. Furthermore, this method does not provide any exact information concerning the absolute temperature profile. Additionally, it has been shown that the use of this method is not reliable with light fabrics for finding a minimum, based on very small differences, caused by strong turbulences at the measuring point.

OBJECT OF THE INVENTION

The object of the invention is to provide a method and an apparatus which allow the elimination of the described disadvantages.

DESCRIPTION OF THE NATURE OF THE INVENTION

The invention is directed to the provision of a method regarding the optimization of thermal treatment processes of surface structrures, preferably textile fabrics, in tensioning, drying and setting machines, allowing reliably finding with simple means of the dryness point of the fabric running through the technological process, and to determine and simultaneously provide sufficient information concerning the thermal state of the fabric, in order to allow implementing technological optimizations by means of the method. A further object of the invention is to provide an apparatus for the execution of the method and the mentioned technological optimization.

According to the invention, the object of the method is solved by providing the technological apparatus for the thermal treatment of fabrics with individual sections, each section being individually operated with heated air of almost constant temperature. The temperature of the air in the sections in the movement direction and the fabric possess approximately the same character towards each other, and the heated air is guided by means of nozzles to the fabric for heating and drying it, and exits the area of the energy exchange via outgoing air slits. Based upon this construction, in the sections of the technological apparatus, the temperature of the outgoing air has to be measured at least at two nozzle slits of the outgoing air, in order to determine the thus ascertained temperature of each measuring location of each section, as well as the difference of the measured temperatures of each section in relation to each other. According to the invention, from the ascertained differences of the outgoing air temperature of the sections, a maximum of the temperature difference for the measuring location pair results in one, or also several, sections, in the immediate vicinity of which lies the dryness point for the fabric whereby, after determining the position of this maximum, the outgoing air temperatures located behind the found maximum in the direction of the movement of the fabric have to be compared with each other. From this comparison the measuring point at which there exists no difference, or only a minimal difference can be derived, from the predetermined technological temperature, whereby the point in the technological apparatus is found, at which the fabric has reached the predetermined technological temperature. Proceeding from the found maximum of the temperature difference of the outgoing air temperatures and the found minimum between outgoing air temperature and technological temperature, with respect to optimization steps, the method of the invention can be extended so that the maximum of the temperature difference, by means of targeted changes of the speed of the moving fabric, or an increase or decrease of the air quantity pressing on the fabric, or a variation of the energy content of the blown-in air quantity, so that the dryness or heating point can be targeted to be placed in a predetermined section of the technological apparatus.

An apparatus for the execution of the method is provided such that along the technological apparatus, at least at two outgoing air slits or in the immediate vicinity thereof, each section is provided with conventionally known electrical or electromechnical temperature sensors for detecting the outgoing air temperature. The connections of the sensors are direct or via electrical intermediate elements, for instance, a comparison location, to an electronic data processing apparatus such that by means of the data processing apparatus, according to the connection thereof, a difference of the measured temperatures or a measured temperature can be determined. The data processing apparatus is provided at its output with connections, from which one or several control signals can be taken, which are connected to an electrical control unit serving for the optimizing control of the technological apparatus.

EXEMPLIFIED EMBODIMENT

The invention will be further explained hereafter by means of an exemplified embodiment.

Figure 2:
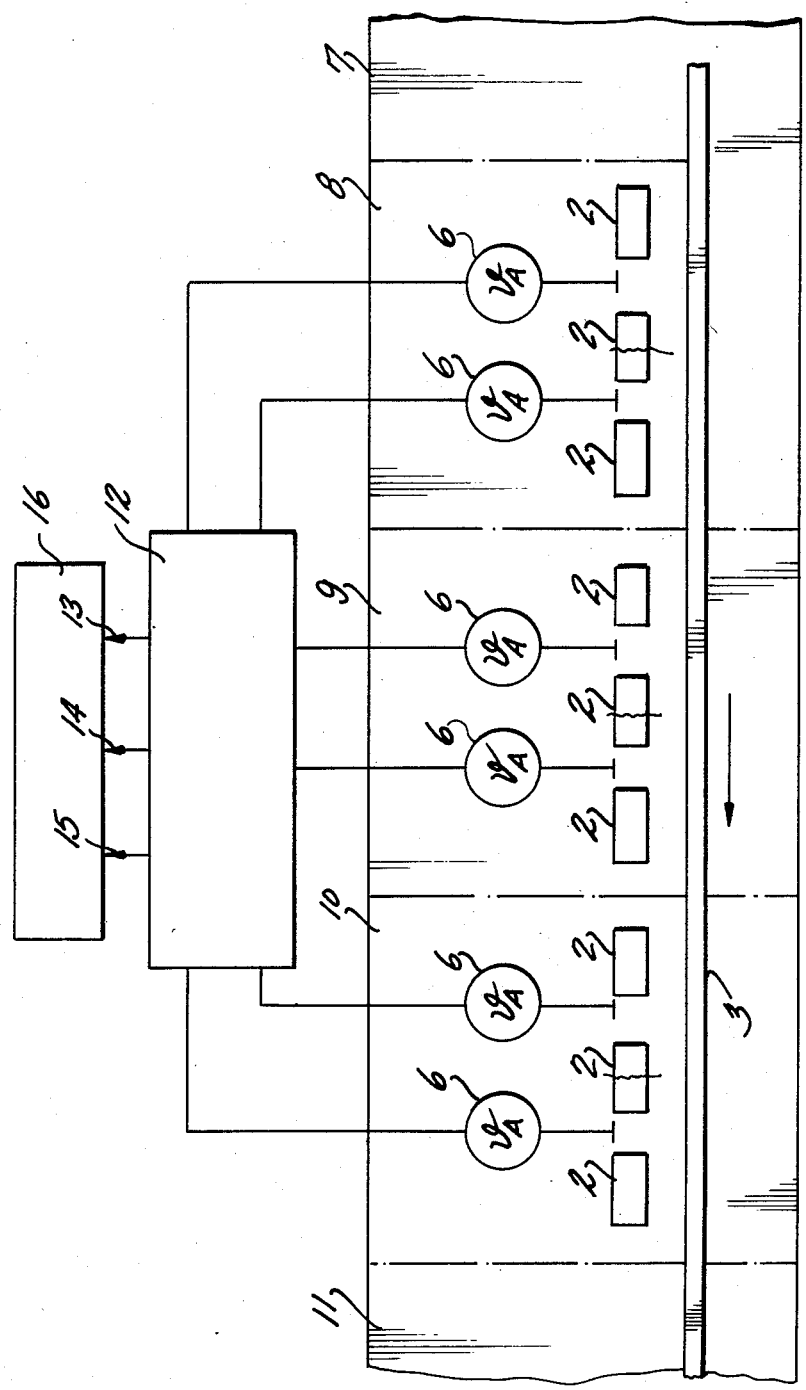
Figure 3:
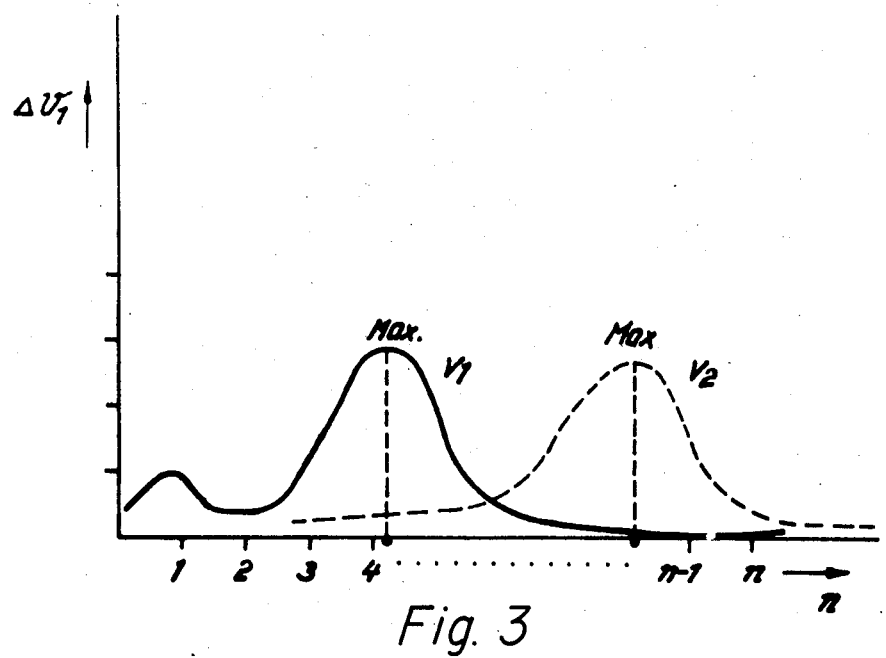
Figure 4:
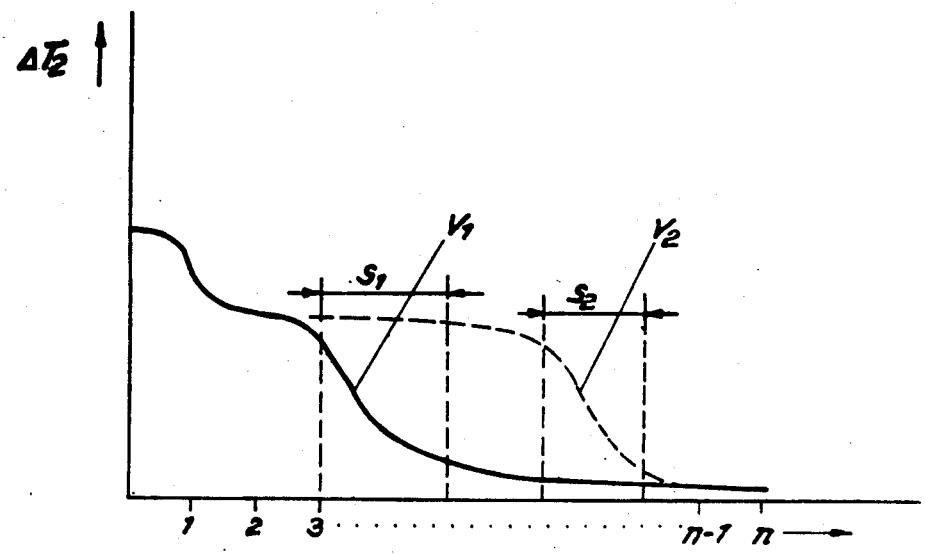

The drawings represent the following:

FIG. 1: Individual section of the apparatus;

FIG. 2: Diagram of the principle of the configuration of the apparatus according to the invention;

FIG. 3: Temperature difference of the outgoing air temperatures in the sections over the number of the sections;

FIG. 4: Temperature difference between the technological temperature and the outgoing air temperature of the sections over the number of the measuring locations.

FIG. 1 represents the section 1 of the apparatus. The fabric 3 runs through it in the direction of the arrow at a velocity v. In the section are provided nozzles 2, out of which heated air 4 flows on the moving fabric 3. Between the nozzles 2, the outgoing air 5 of the temperature $v_A$ off into the space of the section 1. Two sensors 6 for measuring the outgoing air temperature $v_A$.

FIG. 2 shows the entire diagram of the principle of the apparatus, consisting of the sections 7, 8, 9, 10, 11, through which the fabric 3 is moving at a velocity v. In the sections 8, 9, 10 are provided nozzles 2, out of which heated air 4, flows on the fabric 3, as shown in FIG. 1. Between the nozzles 2, for each section 8, 9, 10, are provided two sensors 6, which measure the outgoing air temperature $v_A$ and which are connected to the data processing apparatus 12. The data processing apparatus 12 is provided with output signals 13, 14, 15. When a fabric 3 having to be dried and/or heated enters the apparatus, for instance, at a velocity $v_l$, and runs through the sections 7, 8, 9, 10, 11, and is treated by the heated air 4 according to FIG. 1, an energy exchange occurs between the fabric 3 and the heated air 4. This is reflected in the outgoing air temperature $v_A$ or in the difference of the outgoing air temperatures $\Delta v_1$ by means of various outgoing air temperatures $v_A$ or outgoing air temperature differences $\Delta v_1$, such that it presents itself according to FIG. 3 in the process of the outgoing air temperature difference $\Delta v_1$, according to the function with the velocity $v_1$ as a parameter over the number n of the sections of the technological apparatus. This function shows a maximum of the difference of the outgoing air temperature $\Delta v_1$, which coincides with the position of the dryness point and the respective section n (n = 1, 2, 3, . . . ). Thus the dryness point of the fabric 3 can be clearly determined. For instance, if the velocity v of the fabric 3 is increased to the velocity $v_2$, there occurs a shift of the maximum of the difference of the outgoing air temperature $\Delta v_1$ in its position according to the curve of the velocity $v_2$ as a parameter according to FIG. 3 in another section. Sucn shifts can also be attained by changing the energy supply or the energy content of the heated air 4. By finding the maximum of the difference of the outgoing air temperature $\Delta v_1$ by means of a sensor 6 in the individual sections n and the processing of the measured values in the data processing apparatus 12, the prerequisite is provided for placing the dryness point in a preselected targeted section n of the technological apparatus, in order to create optimal technological conditions.

It is also possible by changing the velocity v, the energy supply, or the energy content of the air, by means of an interconnected serial electrical control unit 16, which is controlled by the output signals 13, 14, 15 of the data processing apparatus 12.

When the drying is completed, it is necessary, furthermore, to find the point, at which the predetermined technological temperature $T_T$ and the temperature of the surface 3 almost correspond. By comparing this technological temperature $T_T$ with the measured outgoing air temperatures $v_4$ in the data processing apparatus 12 to a temperature difference $\Delta T_2$ over the sections n, the function according to FIG. 4 results, from which can be recognized the transition S1, S2, to an absolute minimum of the temperature difference $\Delta T_2$, at which the desired heating of the fabric 3 is reached. Therefore, the position of this minimum can be assigned to a given section n. By finding out the maximum and minimum by means of temperature measurements, by means of the data processing apparatus 12, it is possible to provide such output signals 13, 14, 15, which allow an optimal energy or control of the technological apparatus.

We claim:

1. A method for the optimization of the thermal treatment of a fabric in a tensioning, drying and setting apparatus comprising passing the fabric through a plurality of contiguous heating zones, into each of the zones introducing air heated to substantially the same temperature and directing the air into immediate contact with a surface of the fabric at three areas each closely spaced downstream from the preceding area, in each of the zones immediately uptaking air reflected off the fabric surface in the two intermediate areas defined by the spaces between said three closely spaced areas, immediately sensing the respective temperature of the air uptaken at each of said intermediate areas, registering the temperature differences between the two sensed temperatures in each of the zones, comparing the temperature differences registered in all of the zones, registering the location of said zone exhibiting the greatest said temperature difference, said greatest temperature difference identifying the location of the zone in which drying of the fabric is first completed, registering the temperature to which it is desired further to heat the dried fabric, in the zones located downstream from the zone in which the fabric is first dried comparing the temperature of each uptaken air stream with the desired fabric temperature, registering the temperature differences between the desired fabric temperature and the uptaken air stream temperature for all of the uptaken air streams in said downstream zones, registering the location of the zone in which the difference between the desired fabric temperature and the temperature of an uptaken air stream most closely approximates zero, said approximately zero temperature difference identifying the location of the zone in which further heating of the dried fabric is to be considered first completed, and regulating at least one of the linear speed of the fabric and the volumetric rate of delivery and the temperature of the heated air to control the locations of the respective zones at which drying is first completed and further heating of the dried fabric to the desired fabric temperature is first completed.

* * * * *